(12) United States Patent
Masarwa et al.

(10) Patent No.: US 8,672,240 B2
(45) Date of Patent: *Mar. 18, 2014

(54) IRRIGATION PIPE

(75) Inventors: Abed Masarwa, Taibe (IL); Avi Schweitzer, Hanegev (IL)

(73) Assignee: Netafim, Ltd., Tel Aviv (IL)

( * ) Notice: Subject to any disclaimer, the term of this patent is extended or adjusted under 35 U.S.C. 154(b) by 1059 days.

This patent is subject to a terminal disclaimer.

(21) Appl. No.: 11/220,376

(22) Filed: Sep. 7, 2005

(65) Prior Publication Data

US 2006/0103131 A1    May 18, 2006

Related U.S. Application Data

(63) Continuation-in-part of application No. PCT/IL2005/000244, filed on Mar. 2, 2005.

(60) Provisional application No. 60/548,957, filed on Mar. 2, 2004.

(51) Int. Cl.
*B05B 15/00* (2006.01)
*B65H 75/00* (2006.01)
*F16L 9/18* (2006.01)

(52) U.S. Cl.
USPC ............ 239/547; 239/542; 239/198; 138/124

(58) Field of Classification Search
USPC .......... 138/124, 140, 141; 239/542, 543, 544, 239/547, 200, 201, 195, 196, 197, 198, 276, 239/279; 285/192, 206, 201, 208, 209, 210, 285/197, 39
See application file for complete search history.

(56) References Cited

U.S. PATENT DOCUMENTS

| | | | | |
|---|---|---|---|---|
| 1,143,351 | A | | 6/1915 | Benson |
| 2,107,802 | A | * | 2/1938 | Roach ........................... 285/201 |
| 2,132,636 | A | * | 10/1938 | Maahs .......................... 285/208 |
| 2,457,983 | A | * | 1/1949 | De Swart ................... 285/288.1 |
| 2,595,408 | A | | 5/1952 | Quest |
| 2,758,366 | A | * | 8/1956 | Voetelink ........................ 29/435 |
| 2,776,169 | A | * | 1/1957 | Aschenbrenner ............. 239/547 |
| 3,490,791 | A | | 1/1970 | Mitchell |
| 3,677,578 | A | * | 7/1972 | Roos ........................... 285/140.1 |
| 3,739,985 | A | * | 6/1973 | Odom et al. ................... 239/172 |
| 3,837,619 | A | * | 9/1974 | Sherman ........................ 251/145 |
| 3,863,960 | A | * | 2/1975 | Andersson ....................... 285/39 |
| 4,000,620 | A | | 1/1977 | Burge |
| 4,095,750 | A | | 6/1978 | Gilead |
| 4,132,364 | A | * | 1/1979 | Harmony ....................... 239/542 |
| 4,346,737 | A | * | 8/1982 | Miller .............................. 138/42 |

(Continued)

FOREIGN PATENT DOCUMENTS

| AU | 14194/66 | 5/1969 |
|---|---|---|
| DE | 1964860 | 7/1970 |

(Continued)

*Primary Examiner* — Justin Jonaitis
(74) *Attorney, Agent, or Firm* — Womble Carlyle

(57) ABSTRACT

An irrigation pipe with holes is provided. The pipe is, at least in the area of each hole, multilayered. At least top and bottom layers of the pipe are made of a water-repellant material, and an inner layer of the pipe is made of a porous material. The hole is defined by a cut surface of the pipe wall. The cut surface comprises a seal, which covers at least the inner layer. Each layer may be bonded to adjacent layers.

11 Claims, 8 Drawing Sheets

(56) References Cited

U.S. PATENT DOCUMENTS

| | | | |
|---|---|---|---|
| 4,425,172 A * | 1/1984 | Schirmer | 156/187 |
| 4,445,643 A * | 5/1984 | Thorsby et al. | 239/745 |
| 4,593,857 A | 6/1986 | Raz | |
| 4,654,942 A * | 4/1987 | Rush et al. | 29/890.144 |
| 4,722,759 A | 2/1988 | Roberts et al. | |
| 4,732,329 A | 3/1988 | Martin | |
| 4,756,339 A * | 7/1988 | Buluschek | 138/115 |
| 4,807,668 A * | 2/1989 | Roberts | 138/103 |
| 4,880,167 A | 11/1989 | Langa et al. | |
| 4,948,295 A * | 8/1990 | Pramsoler | 405/44 |
| 5,145,216 A * | 9/1992 | Valls, Jr. | 285/140.1 |
| 5,211,426 A | 5/1993 | Guignard et al. | |
| 5,263,791 A | 11/1993 | Zeman | |
| 5,326,139 A * | 7/1994 | Corcoran | 285/197 |
| 5,560,654 A | 10/1996 | Cobb, Jr. | |
| 5,744,779 A * | 4/1998 | Buluschek | 219/121.71 |
| 6,065,321 A | 5/2000 | Kosch et al. | |
| 6,619,565 B1 * | 9/2003 | Abbott | 239/273 |
| 6,681,796 B2 | 1/2004 | King, Jr. | |
| 6,942,166 B2 * | 9/2005 | Tanimoto | 239/547 |
| 6,996,932 B2 * | 2/2006 | Kruer et al. | 47/48.5 |
| 7,588,201 B2 * | 9/2009 | Masarwa et al. | 239/547 |
| 2002/0047053 A1 * | 4/2002 | Bron | 239/542 |
| 2003/0201345 A1 * | 10/2003 | Jeong | 239/542 |
| 2004/0046065 A1 | 3/2004 | Jeong | |
| 2004/0050975 A1 | 3/2004 | Panourgias et al. | |
| 2005/0109414 A1 | 5/2005 | Jeong | |
| 2006/0103132 A1 * | 5/2006 | Hardin et al. | 285/192 |

FOREIGN PATENT DOCUMENTS

| | | |
|---|---|---|
| EP | 0284570 | 9/1988 |
| FR | 2027029 | 9/1970 |
| FR | 2551834 | 3/1985 |
| GB | 833835 | 5/1960 |
| GB | 1 205 983 | 9/1970 |
| GB | 2 187 622 A | 9/1987 |
| GB | 2187622 | 9/1987 |
| JP | 08 318177 | 12/1996 |
| JP | 8318177 | 12/1996 |
| RU | 2 134 036 C1 | 8/1999 |
| RU | 2134036 | 8/1999 |
| WO | 92/05689 A1 | 4/1992 |
| WO | 02/066881 A1 | 8/2002 |
| WO | WO 02/066881 | 8/2002 |
| WO | 03/031164 A1 | 4/2003 |
| WO | 2005/084418 A2 | 9/2005 |
| WO | WO 2005/084418 | 9/2005 |

* cited by examiner

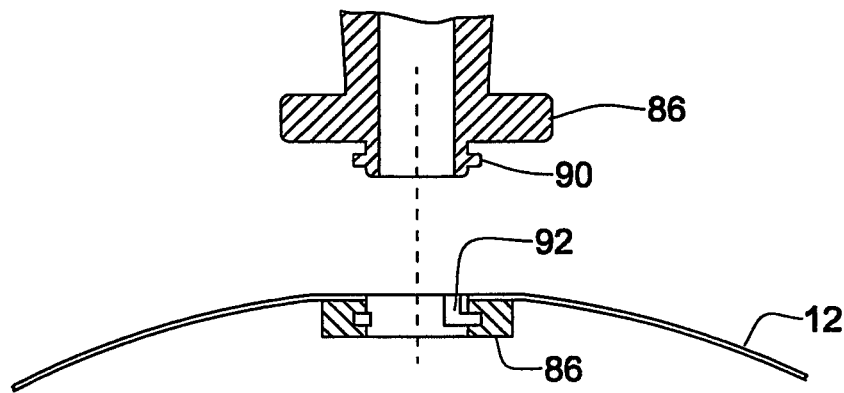
FIG. 8
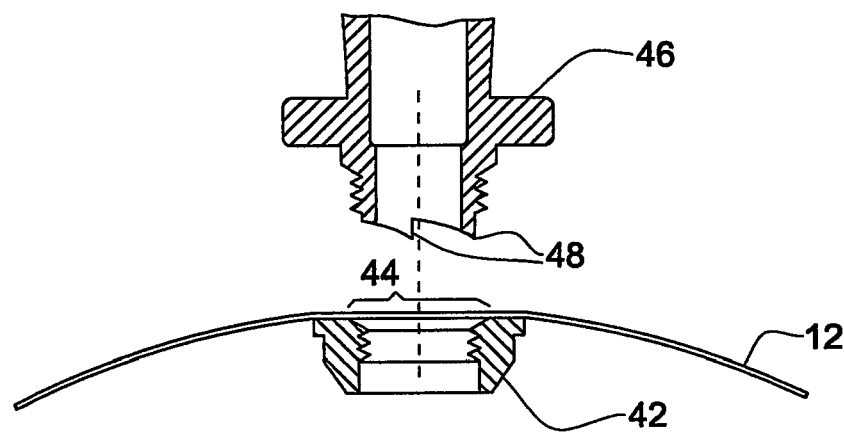
FIG. 9
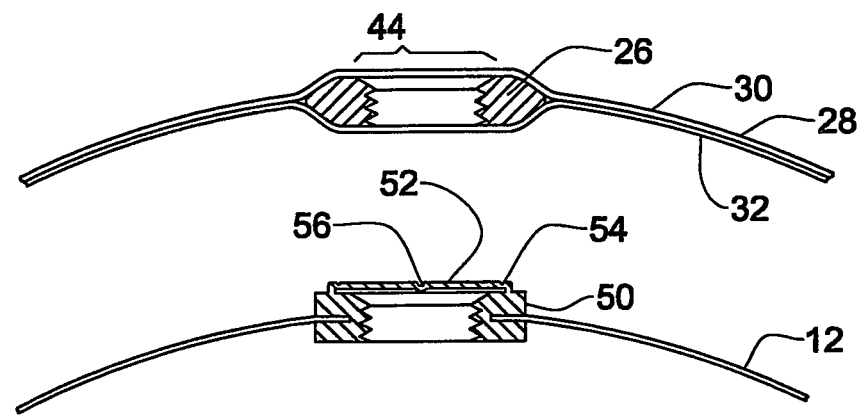
FIG. 10
FIG. 11

IRRIGATION PIPE

This application is a Continuation in Part, and claims the benefit of, PCT application number PCT/IL2005/000244, filed on Mar. 2, 2005, which itself claims priority to U.S. Provisional Patent Application No. 60/548,957, filed on Mar. 2, 2004.

FIELD OF THE INVENTION

This invention relates to irrigation pipes, in particular to pipes for assembling branching irrigation networks.

BACKGROUND OF THE INVENTION

Modern irrigation typically employs large pipe networks, for example in drip irrigation systems or in flood systems. An irrigation network includes main water supply pipes and irrigation branches deployed and assembled on the field. The assembly of branches is made usually by specially designed lateral connectors and involves considerable labor costs but does not always prevent leakages.

For example, publications WO 02/066881 and JP08318177 disclose connectors for mounting lateral outlets of small diameter to the wall of a flexible, rollable and collapsible pipe of large diameter. These connectors comprise a tubular member with flaring end and external thread, and a matching nut. The pipe wall is punched in the field, in desired locations on its wall. The flaring end of the connector is then inserted in a wall opening which expands elastically and grips the connector above the flaring end. The connector is secured to the pipe by tightening the nut against the flaring end.

In this application, the term "rollable pipe" means a pipe that is flexible enough to be rolled in a reel for any purpose, e.g. packaging, transportation, storage, sale, etc. The term "collapsible pipe" means a pipe which tends to collapse when left empty, for example lay-flat pipe. A rollable pipe may be or may not be collapsible.

SUMMARY OF THE INVENTION

In accordance with one aspect of the present invention, there is provided an irrigation pipe with a plurality of connector elements for attachment of lateral branches thereto after its manufacture, wherein the connector elements are integrally fitted to the wall of the pipe during the manufacture. The pipe may be rigid, rollable, and collapsible (lay-flat pipe). Preferably, the pipe is adapted for being cut into a plurality of sections each having a plurality of the connector elements. During the manufacture, each of the connector elements may be fitted open and be adapted for closing after manufacture if not intended for use, or may be fitted closed and be adapted for opening after manufacture to enable the attachment. A connector element may be as well fitted open without being adapted for closing.

In one embodiment, the walls of the pipe are punched during the manufacture, and open connector elements are fitted on the holes.

In another embodiment, the connector elements are fitted closed by an enclosure adapted to preserve pipe's fluid tightness under operative pressure. The enclosure may be, for example, a portion of the wall of the pipe, and/or a portion of the connector element, and/or a separate body fitted to the connector element, or may be of other appropriate design. The enclosure may have an annular notch facilitating the opening.

The connector elements may be fitted for example in the following positions:
  adjacent the internal surface of said pipe;
  adjacent the external surface of said pipe;
  embracing portions of the internal and the external surface of said pipe; and
  embedded between the internal and the external surface of said wall.

The connector elements may be formed from material of the pipe.

Alternatively, the connector element may be a pad fitted closed to the wall and adapted for boring an opening therethrough in the field, thereby enabling the attachment.

Examples of means for attachment of the connector elements to the lateral branches may be: internal or external thread; bayonet lock; a bore with taper adapted for holding a counterpart element of the lateral branch by friction; a bore and usage of material adapted for assembly with a self-tapping counterpart element of the lateral branch, or the like.

In accordance with another aspect of the present invention, there is provided an irrigation pipe with holes. The pipe is, at least in the area of each hole, multilayered. At least top and bottom layers of the pipe are made of a water-repellant material, and an inner layer of the pipe is made of a porous material. The hole is defined by a cut surface of the pipe wall. The cut surface comprises a seal, which covers at least the inner layer. Each layer may be bonded to adjacent layers.

According to one embodiment, the pipe comprises a pipe connector having a circumferential slot around a sidewall thereof. The slot is formed so as to provide a tight fit of the portion of the irrigation pipe wall adjacent the hole within it. The pipe connector constitutes the seal. The pipe connector may be molded on the irrigation pipe.

According to another embodiment, the top and bottom layers are made from a meltable material. The hole is formed by a heated-punching technique which results in some of the material of at least one of the top or bottom layers to form the seal. The heated-punching may be carried out with a laser. The laser may have a power within the range of 10-200 W, a cutting speed within the range of 3-20 mm/s, a frequency within the range of 1-10 Hz. The hole may be formed by 1-30 cycles of the laser. Alternatively, the heated-punching may be carried by a hot-punch or an ultrasonic punch.

In accordance with another aspect of the present invention, there is provided a method for forming a hole in an irrigation pipe wall. The pipe wall is multilayered and having at least top and bottom layers made of a water-repellant material, and an inner layer being made of a porous material. The method comprises the steps of:
  (a) forming the hole in the pipe wall, the hole being defined by a cut surface of the pipe wall; and
  (b) sealing said cut surface at least in the area of the inner layer.

Each layer is of the pipe wall may be bonded to adjacent layers.

According to one embodiment, the pipe comprises a pipe connector having a circumferential slot around a sidewall thereof. The slot is formed so as to provide a tight fit of the portion of the pipe wall adjacent the hole within it. The pipe connector constitutes the seal. The pipe connector may be molded on the pipe.

According to another embodiment, the top and bottom layers are made from a meltable material. The hole is formed by a heated-punching technique which results in some of the material of at least one of the top or bottom layers to form the seal. The heated-punching may be carried out with a laser. The laser may have a power within the range of 10-200 W, a cutting speed within the range of 3-20 mm/s, a frequency within the range of 1-10 Hz. The hole may be formed by 1-30 cycles of the laser. Alternatively, the heated-punching may be carried by a hot-punch or an ultrasonic punch.

In accordance with another aspect of the present invention, there is provided an irrigation pipe with an extended connector element for attachment of lateral branches thereto after manufacture, for example in the field, wherein the extended connector element is integrally fitted to the pipe's wall during manufacture thereof and is adapted for boring through openings in desired locations thereof, such that two or more lateral branches can be attached to these locations.

The extended connector element may be for example an elongated strip extending parallel to the axis of the pipe, or an annulus (ring) or part thereof, or an elongated strip disposed along a helical line, or just any pad large enough to accommodate two or more branch connectors. Preferably, the extended connector element is made of suitable material, such that counterpart elements of the lateral branches may be held in the openings by friction or by self-tapping.

In a pipe manufactured from a flat sheet by joining edges thereof in a seam, the extended connector element may be fitted into the seam.

In accordance with both aspects of the present invention, the pipe may be produced as high or low pressure resistant hose made of polymer materials strengthened by bonded layer or layers such as textile, knitted woven or non-woven fabric, bi-oriented polymer, high stiffness polymer, etc. Polymer materials such as PE, PP, PVC, TPE, elastomers and others may be used.

The pipe may be manufactured by any appropriate process, e.g. extrusion, casting, blowing, welding or bonding of sheet material, etc. In particular, the integral connector elements may be fitted into the pipe during manufacture by extrusion by the method for fitting in-line drip emitters, as for example disclosed in U.S. Pat. No. 5,324,371.

In accordance with yet another aspect of the present invention, there is provided a method for production of a semi-finished pipe, including: providing a plurality of irrigation elements; providing strips of flexible weldable or bondable material, such as polymer sheet; and fitting integrally the connector elements to predetermined locations on the strip. The irrigation elements may be connector elements for assembly of lateral branches to said pipe, drip emitters or sprinklers, etc. The irrigation elements may be fitted, for example, by welding or bonding, preferably by ultrasonic welding.

The irrigation pipe may be finished on the same or another production line by bending or twisting the strip so as to juxtapose or overlap its lateral edges, and welding or bonding integrally the edges so as to obtain a closed pipe section. The method may include punching holes in the predetermined places.

The bending or twisting may be performed such that the connectors remain either inside the pipe or outside the pipe.

The edges of the strip may be connected in a straight seam or in a spiral seam.

In accordance with a further aspect of the present invention, there is provided a method for production of an irrigation pipe which includes:
   providing a strip of flexible weldable or bondable material;
   bending or twisting the strip so as to overlap lateral margins thereof;
   welding or bonding integrally the margins so as to obtain a seam and a closed pipe section; and application and welding or bonding an additional tape over the seam, at the internal and/or external side of the pipe, so as to seal the seam and/or the edges.

Preferably, the additional tape is welded or bonded to the lateral margins of the strip before obtaining a closed pipe section.

Preferably, the additional tape is welded by hot air welding.

The integral connectors offer rapid and easy assembly of branching pipes. The integral connectors are reliably fitted during manufacture, yet the user is able to choose the locations of the branches in the field. The non-used connector elements can be easily closed or just may be left unopened. Due to the low profile of the connector elements, the pipe may be rolled in rather tight reels suitable for packaging, transportation, storage and sale, etc. The pipe can be retrieved at the end of the irrigation season. The pipe is cheap, low-weight and low-volume, and allows easy surface and subsurface installation.

BRIEF DESCRIPTION OF THE DRAWINGS

In order to understand the invention and to see how it may be carried out in practice, a number of embodiments will now be described, by way of non-limiting examples only, with reference to the accompanying drawings, in which:

FIG. 8 is a sectional view of an integral connector element and a lateral connector constituting a bayonet lock;

FIG. 9 is a sectional view of an internally fitted connector element initially closed by the pipe wall and a lateral connector with cutting teeth;

FIG. 10 is a sectional view of a connector element fitted between two layers of an irrigation pipe;

FIG. 11 is a sectional view of a connector element initially closed by an integral notched lid;

DETAILED DESCRIPTION OF EXEMPLARY EMBODIMENTS

Figure 1:
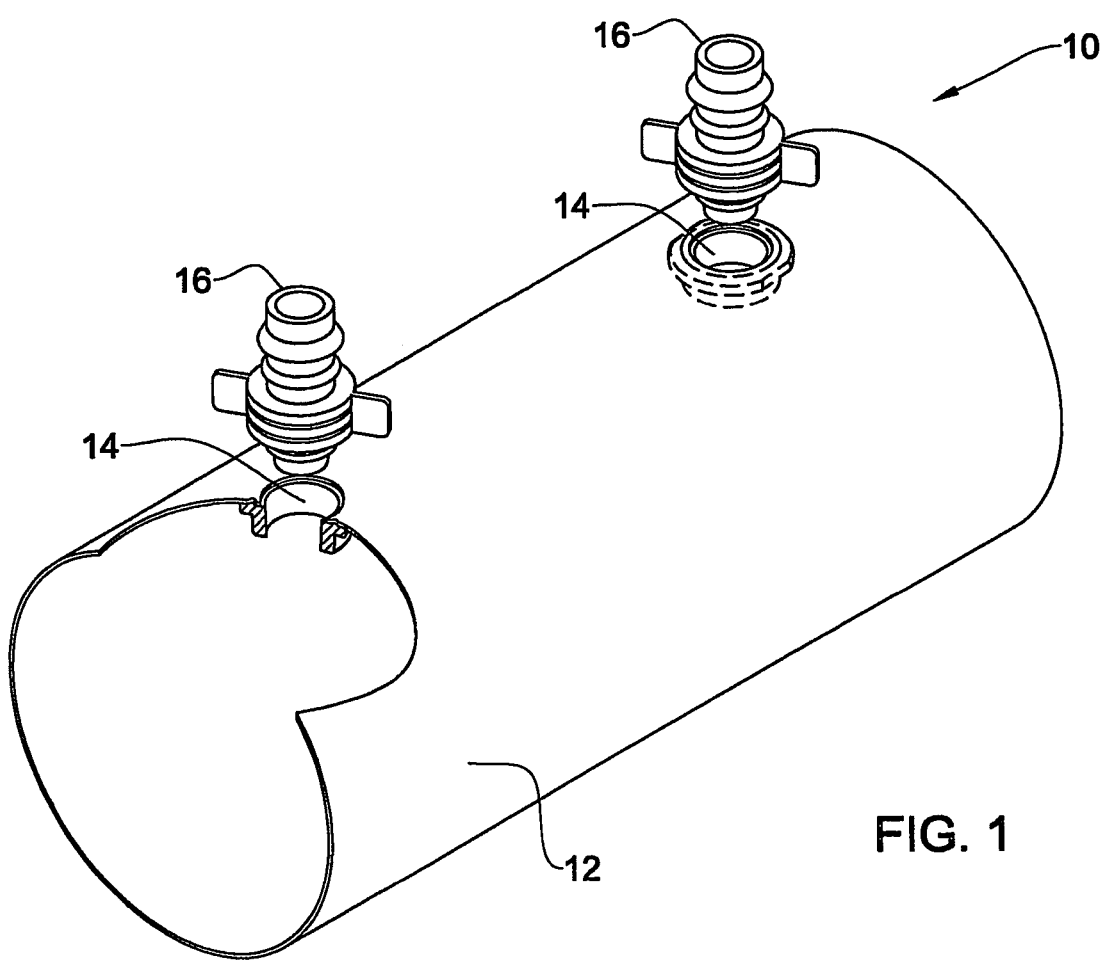
FIG. 1 is a perspective view of an irrigation pipe of the present invention, with integral connector elements and branch connectors.
Figure 2:
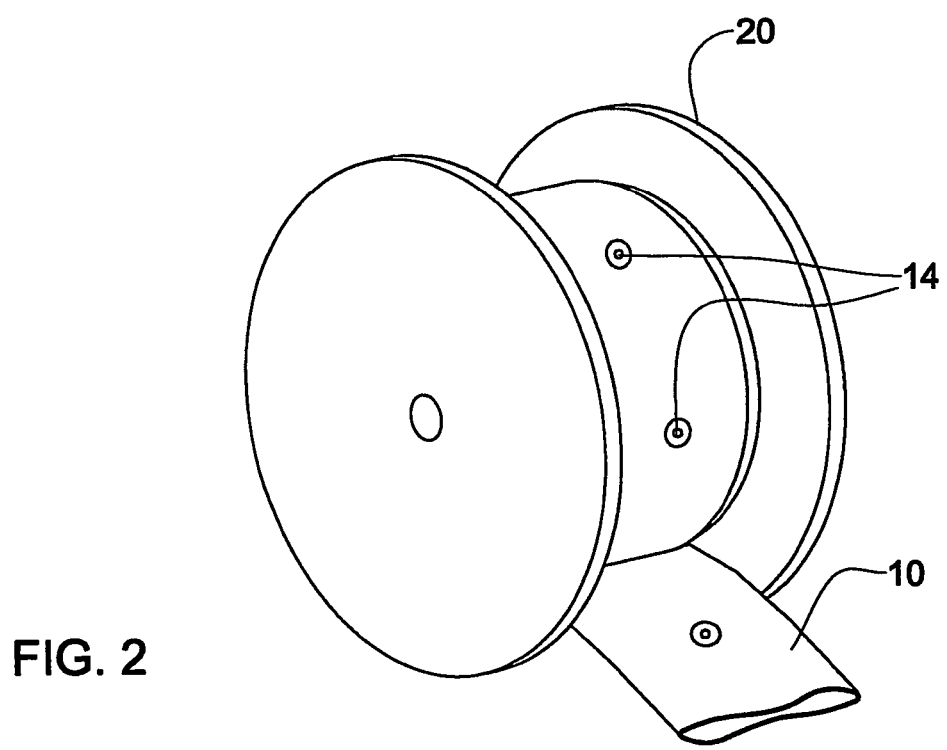
FIG. 2 is an illustration of a collapsible irrigation pipe with integral connectors rolled on a reel.
Figure 3:
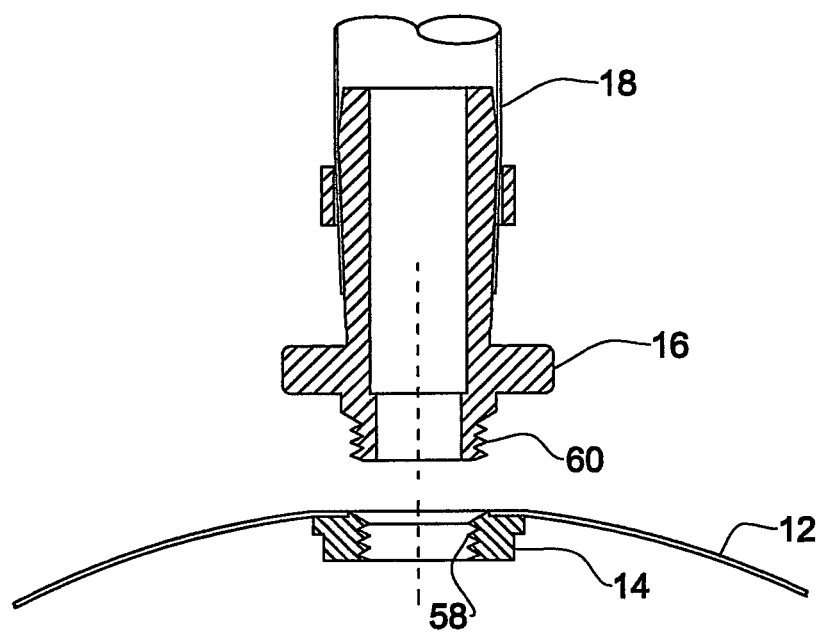
FIG. 3 is a sectional view of an internally fitted threaded connector element in an irrigation pipe, and a lateral branch connector.

With reference to FIGS. 1, 2 and 3, an irrigation pipe 10 of the present invention comprises a pipe 12 and integral pipe connectors 14 fitted to the wall of the pipe during the manufacture. The pipe connectors 14 are adapted for assembly with lateral connectors 16 for branching pipes 18. The pipe 10 may be rolled on a reel 20, as in the example of a collapsible pipe (lay-flat pipe) shown in FIG. 2.

Figure 4A:
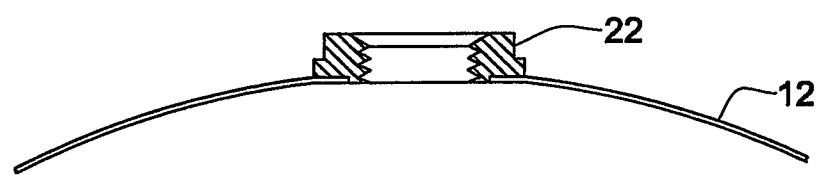
FIG. 4A is a sectional view of an externally fitted threaded connector element.
Figure 4B:
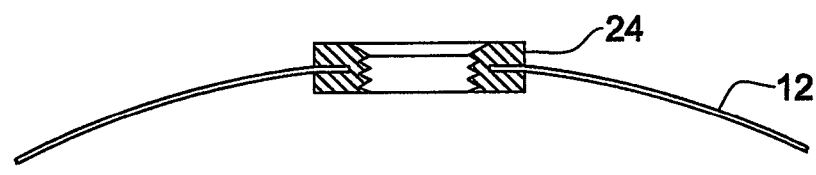
FIG. 4B is a sectional view of a connector element fitting the irrigation pipe from both sides.
Figure 4C:
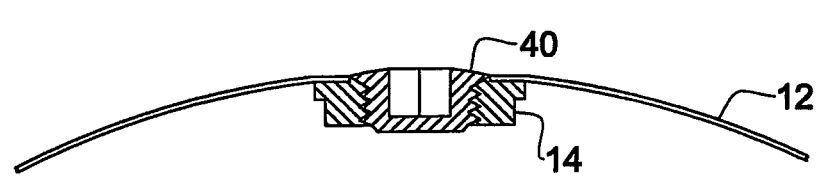
FIG. 4C is a sectional view of a threaded connector element with threaded enclosure.

FIGS. 3, 4A, 4B and 10 show integral connectors fitted in the following positions:

adjacent to the internal surface of the pipe 12, connector 14 in FIG. 3;

adjacent to the external surface of the pipe 12, connector 22 in FIG. 4A;

embracing portions of the internal and the external surface of the pipe 12, connector 24 in FIG. 4B; and embedded in the wall of a pipe 28, between two layers 30 and 32 forming the pipe wall—connector 26 in FIG. 10.

Figure 4D:
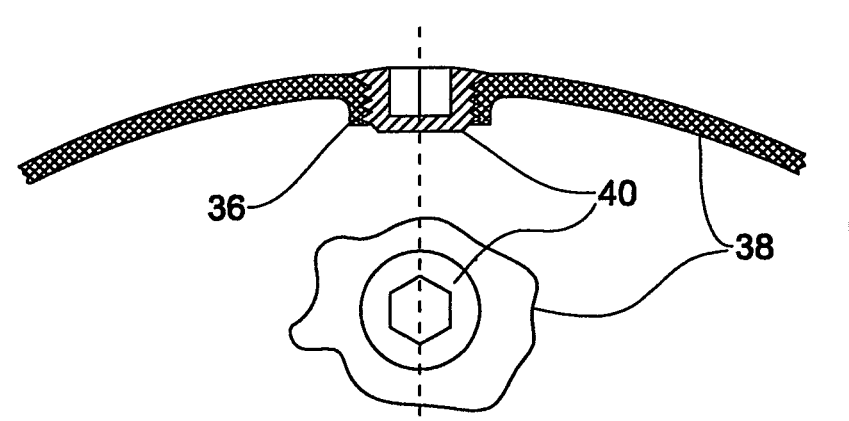
FIG. 4D is a sectional view of a threaded connector element formed from the material of the irrigation pipe wall.

As shown in FIG. 4D, an integral connector 36 may be formed from material of the pipe wall 38.

As seen in FIGS. 3 to 8, the walls of the irrigation pipe 12 may be punched during the manufacture and left open, so that the pipe connectors are fitted open and ready for assembly with the lateral connectors. In this case, the pipe connectors 14, 22, 24, 36 may be provided with caps 40 for closing connectors that will not be used in the field. The caps preserve pipe's fluid tightness under operative pressure.

Alternatively, as shown in FIGS. 9, 10 and 11, pipe connectors may have integral enclosures preserving pipe's fluid tightness under the operative pressure. Such pipe connectors can be used for assembly after removal of the enclosure which may be material of the wall, of the connector, or both.

In particular, FIGS. 9 and 10 show integral pipe connectors 42 and 26 respectively, closed by a portion 44 of the pipe wall 12. The portion 44 may be cut out before assembly by means of a suitable tool (see, for example, FIG. 12, where such tool is used with connectors of another kind). Alternatively, a lateral connector 46 may be formed with cutting teeth 48. In the latter case, the pipe connector 42 may need higher profile to accommodate safely the teeth 48 after the assembly.

FIG. 11 shows an integral pipe connector 50 made of a single piece of material with enclosure 52. The enclosure 52 may be made formed with means for facilitating its removal, for example, an annular notch 54 and a guiding recess 56 for supporting the tip of a rotary cutting tool.

FIGS. 3 and 5 to 8 illustrate a few possible means for assembly of the integral pipe connectors to lateral connectors. FIG. 3 shows the pipe connector 14 with internal thread 58 and a lateral connector 16 with matching external thread 60.

Figure 5:
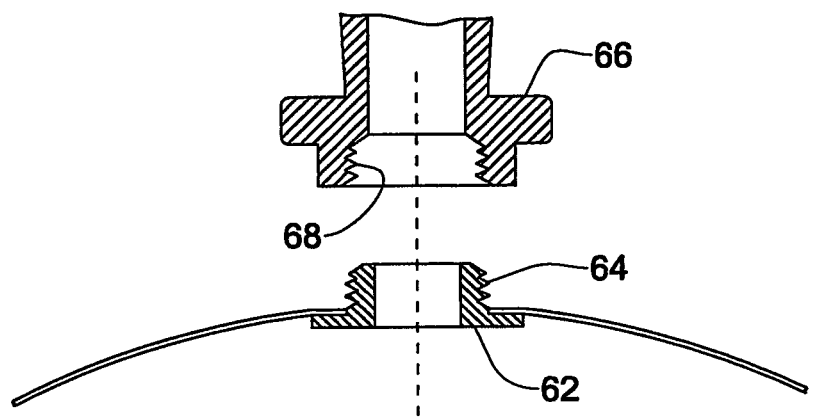
FIG. 5 is a sectional view of a connector element with external thread and a matching lateral connector with internal thread.
Figure 6:
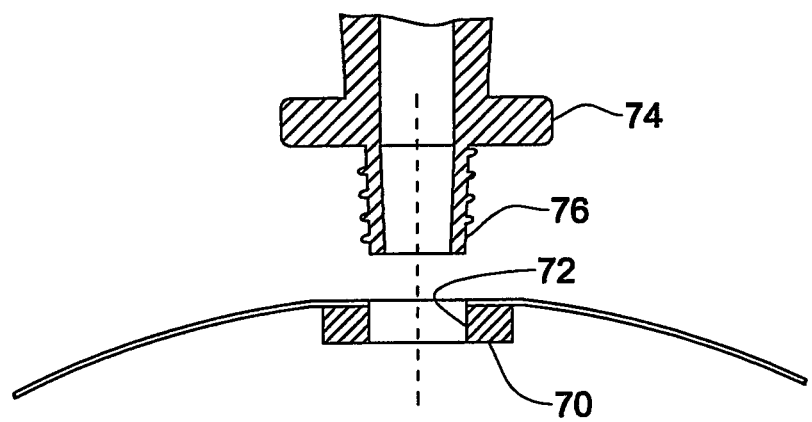
FIG. 6 is a sectional view of a connector element fitted to an irrigation pipe and adapted for assembly with a self-tapping lateral connector.
Figure 7:
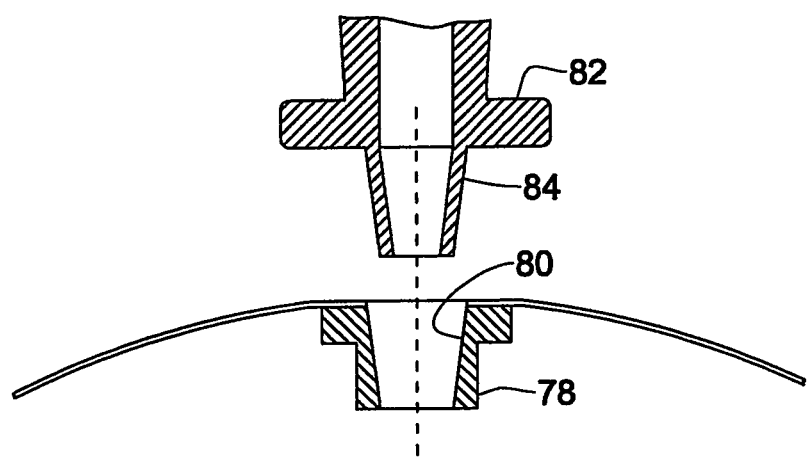
FIG. 7 is a sectional view of a connector element with tapering (cone) bore adapted for friction assembly with a matching tapered lateral connector.

As shown in FIG. 5, a pipe connector 62 may be made with external thread 64 while a lateral connector 66 may have an internal thread 68. FIG. 6 shows a pipe connector 70 with smooth bore 72 made of relatively soft material while a lateral connector 74 is made with threaded nozzle 76 of relatively hard material such that the nozzle 76 can be self-tapped into the bore 72. FIG. 7 shows a pipe connector 78 with a tapered (conical) bore 80 and a matching lateral connector 82 with tapered nozzle 84. The angle of taper and the materials of the connectors are selected so as to provide reliable grip by friction after assembly. FIG. 8 shows an integral pipe connector 86 and a lateral connector 88 formed as matching parts of a bayonet lock with lugs 90 and L-shaped channels 92.

Figure 17:
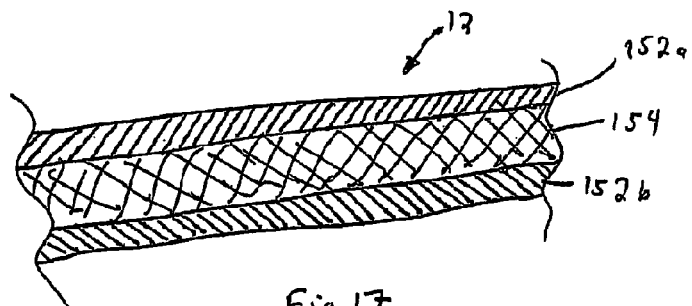
FIG. 17 is a cross-sectional side view of a pipe wall.

As illustrated in FIG. 17, the wall of the pipe 12 may comprises several layers. Top and bottom layers (which comprise, respectively, the exterior and interior surfaces of the pipe), indicated by 152a and 152b, are made from water-repellant materials. These may be polymers, such as PE, PP, PVC, and TPE, elastomers, or copolymers. An inner layer 154 is provided, which is made from a porous material, such as a textile, woven on non-woven fabric, or bi-oriented or high-stiffness polymer. It will be appreciated that other layers may exist, and each layer may comprise sub-layers of similar or different materials.

Figure 18:
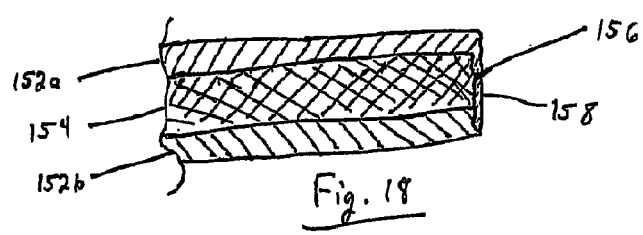
FIG. 18 is a cross-sectional side view of the pipe wall illustrated in FIG. 17 at a location of cutting according to one embodiment of the present invention.

In accordance with another aspect of the present invention, a hole is formed in the pipe illustrated in FIG. 17, such that the inner layer 154 is sealed. This is done to prevent water from being absorbed thereby. According to one embodiment, the material of the top and bottom layers 152a, 152b is meltable. The hole is formed by a heated-punching technique, such as hot-punching, ultrasonic-punching, or by use of a laser. By using one of these techniques, as seen in FIG. 18, some of the material of at least one of the top and bottom layers 152a, 152b will melt and cover the cut surface 156 of the pipe 12, at least in the area of the inner layer 154. The melted material sets, forming the seal 158.

When a laser is used, it should preferably have a power within the range of 10-200 W, a cutting speed within the range of 3-20 mm/s, and a frequency within the range of 1-10 Hz. Furthermore, 1-30 passes of the laser can be used to fully form the hole. Specifically, a hole as described above has been formed experimentally by using a laser having a power of 50 W, a speed of 10 mm/s, a frequency of 5 Hz, and using 2 passes of the laser.

Figure 19:
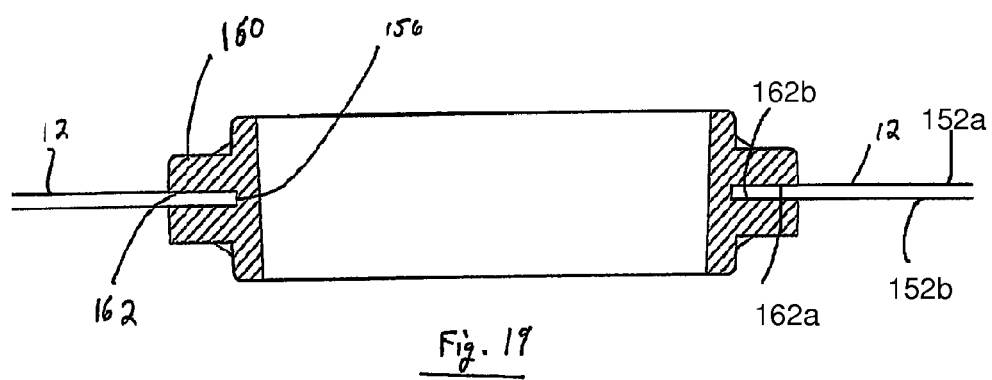
FIG. 19 is a cross-sectional side view of a connector according to one aspect of the present invention.
Figure 20:
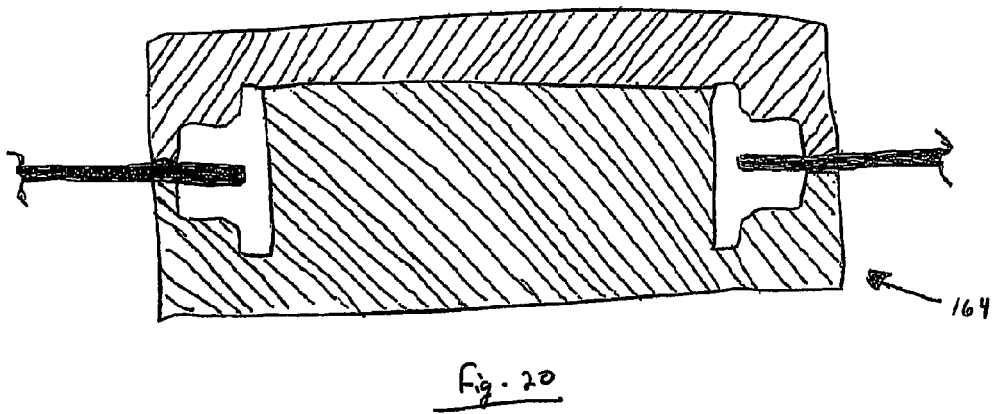
FIG. 20 is a cross-sectional side view of a mold which may be used to produce the connector illustrated in FIG. 19.

According to another embodiment, the sealing is accomplished by using a connector 160 which seals the cut surface 156 of the pipe 12. Such a connector, illustrated in FIG. 19, comprises a circumferential slot 162 formed so that the pipe wall tightly fits within it, with the oppositely facing top layer 152a and bottom layer 152b of the pipe 12 being abutted by corresponding opposing top and bottom abutment surfaces 162a, 162b, respectively, of the slot 162. As seen in the cross-sectional view of FIG. 19, the opposing top and bottom abutment surfaces 162a, 162b are minor images of one another. Indeed, the entire connector 160 may be minor symmetric about the slot 162. The connector itself, when the pipe wall adjacent the hole is fit therein, constitutes the seal. The connector may either be preformed and fitted with the pipe, or, as illustrated in FIG. 20, a mold, generally indicated at 164, may be used to form the connector 160 directly on the pipe.

Figure 12:
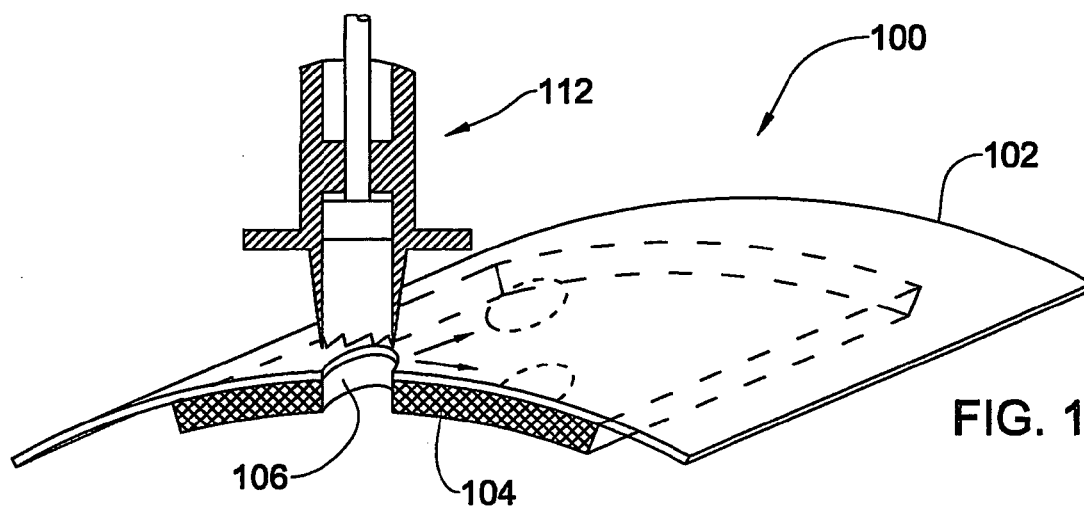
FIG. 12 is a sectional perspective view of an irrigation pipe of the present invention, with integral connector elements of a second type, prepared for boring.
Figure 13:
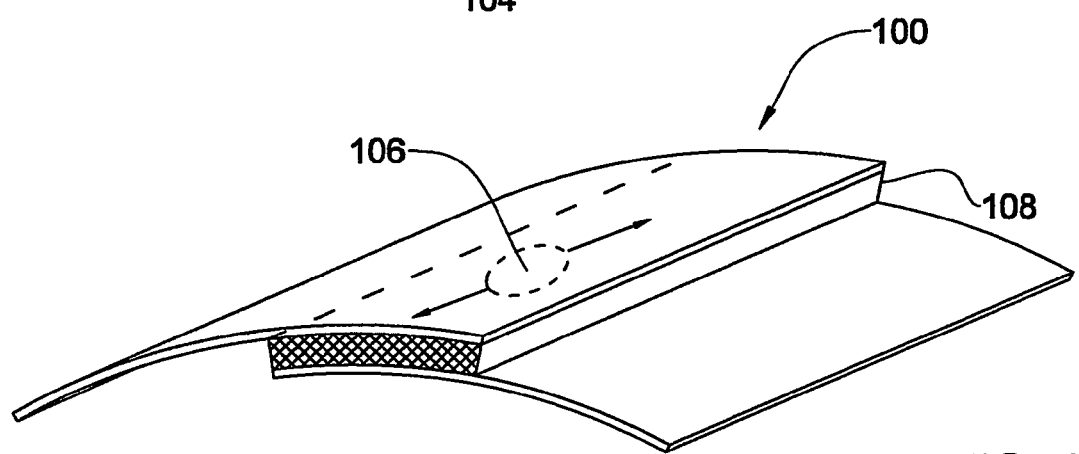
FIG. 13 is a sectional perspective view of an integral connector element of the second type fitted in a longitudinal overlap seam of an irrigation pipe.
Figure 14:
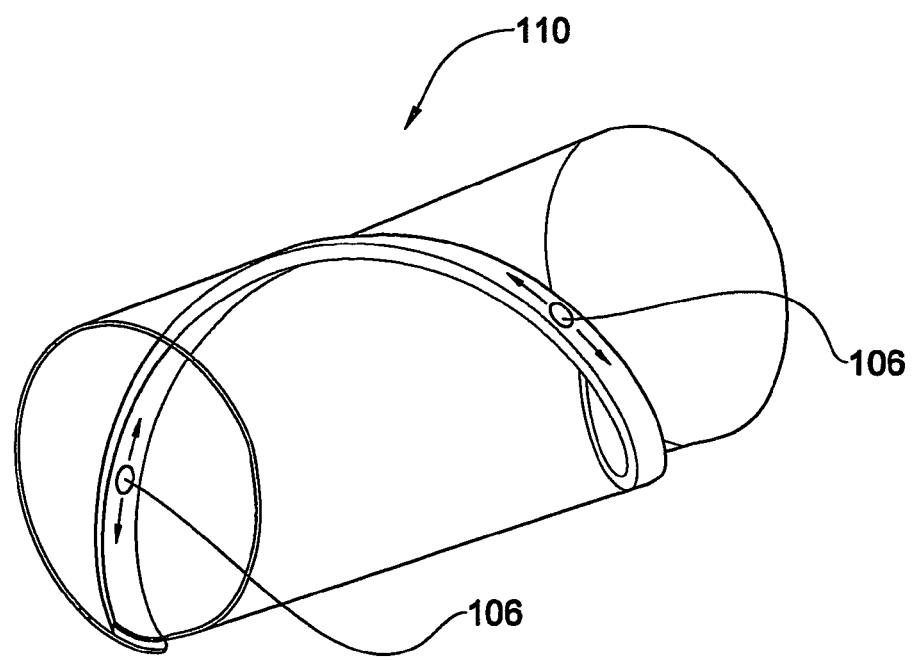
FIG. 14 is a perspective view of a spiral-welded irrigation pipe with a connector element of the second type fitted in a spiral seam.

In accordance with another aspect of the present invention illustrated in FIGS. 12 to 14, an irrigation pipe 100 comprises a flexible pipe 102 and an extended connector element 104 which is integrally fitted to the pipe's wall during manufacture. The extended connector element 104 has sufficient size, such that a plurality of bores 106 can be made and lateral connectors can be attached in desired locations after the manufacture. As seen in FIG. 13, a band 108 of suitable material can be fitted along the irrigation pipe 100 as a continuous integral pipe connector. Such band is especially suitable for fitting in an overlapping seam, for example in a spiral-welded pipe 110 as shown in FIG. 14, or in the straight-seam pipe 100 of FIG. 13.

The integral connector element 104 or 108 may be bored by a rotary tool, such as the tool 112 in FIG. 12, for assembly with a self-tapping lateral connector such as 74 in FIG. 6, or with a tapered lateral connector held by friction, such as 82 in FIG. 7.

Figure 15:
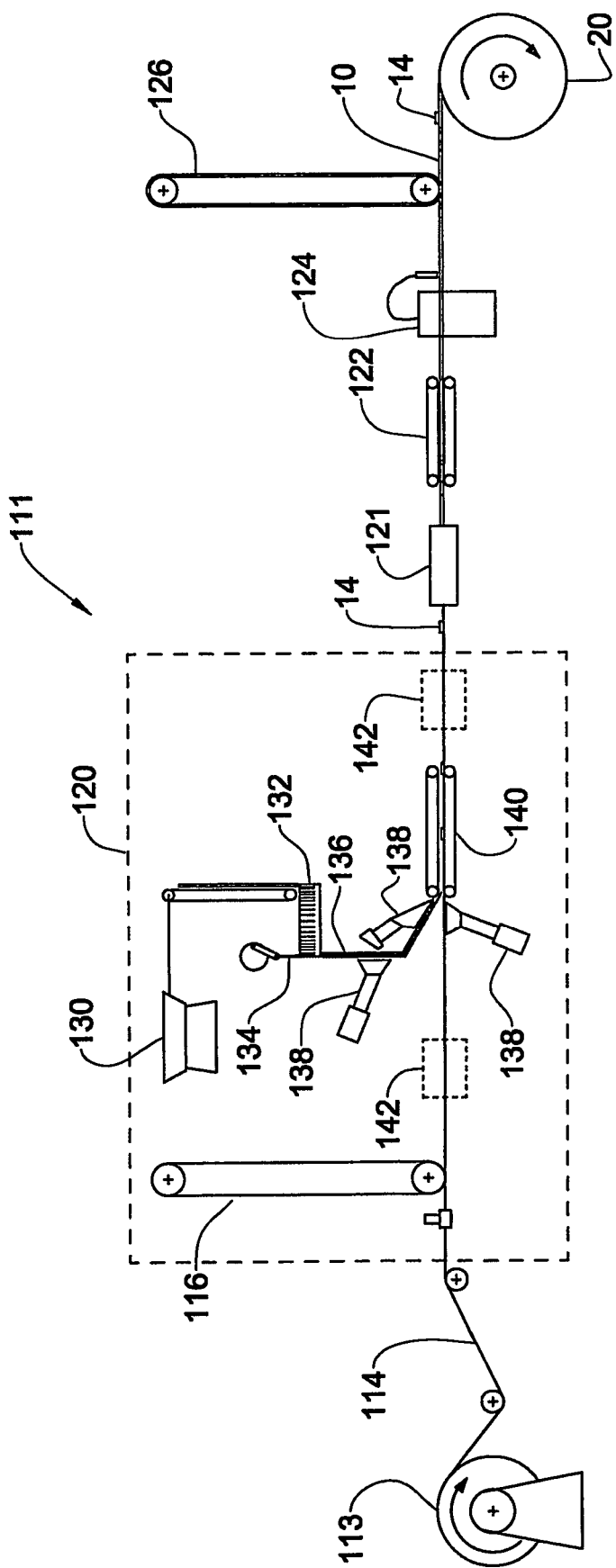
FIG. 15 shows a production scheme of a rollable pipe with integral connectors.

With reference to FIG. 15, there is shown an exemplary production scheme of a rollable polymer pipe 10 with integral connectors 14, according to yet another aspect of the present invention. The production is performed on a conveyor line 111 including: feeding reel 113 for feeding raw strip material 114, strip accumulator 116, connectors fitting section 120, piping apparatus 121, puller 122, printing and monitoring station 124, pipe accumulator 126, and a receiving reel 20 for the pipe 10.

The connectors fitting section 120 includes connectors stock feeder 130, a drum magazine 132, a feeding plunger 134, a chute 136, welding equipment units 138, a pulling unit 140, and an optional punching device 142.

In the operation of the conveyor, the raw polymer sheet material is first cut into strips 114 of predetermined width, and is wound on feeding reels 113 (this process is done before the reel 113 is loaded to the line 111). The strip 114 is fed to the accumulator 116 and further to the connector fitting section 120.

In the connector fitting section 120, the connectors feeder 130 loads the drum magazine 132 with pipe connectors 14 arranging them in predetermined orientation. The drum magazine 132 rotates in steps, at predetermined intervals of time, and the feeding plunger 134 periodically pushes a connector 14 down the chute 136. The connector is directed to the welding units 138.

The raw strip 114 is also directed to the welding units 138, the connector 14 is positioned on the flat strip 114 and ultrasonic welding or RF (microwave) welding is performed. The strip 114 is pulled by the puller unit 140. The strip 114 may be optionally punched at the openings of the connectors in the punching device 142, before or after the welding, in dependence, for example, on the configuration of the connector.

The strip 114 with welded connectors 14 is then fed to the piping apparatus 121. There, the strip is bent (twisted) into a sleeve with juxtaposed edges or overlapping margins, and the edges or margins are welded by a watertight seam into a pipe with closed section. The connectors may remain either at the outer side of the pipe, or at the inside, as desired. The pipe 10 may be welded by the same method as the connectors, or by a different one.

The ready pipe 10 is pulled by the puller 122, checked and stamped in the printing and monitoring station 124 and, via the accumulator 126, is wound on the receiving reel 20.

Figure 16A:
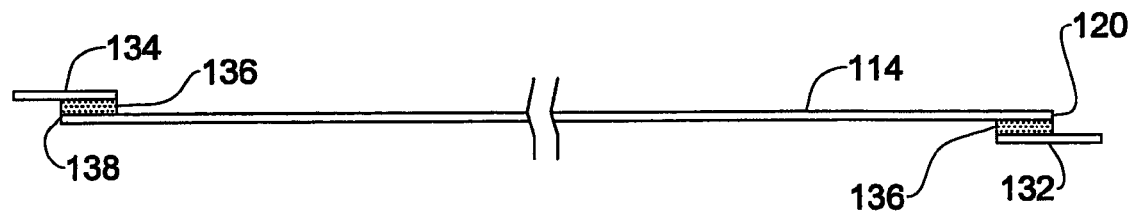
FIGS. 16A, 16B and 16C show a process of rollable pipe welding with protective tapes according to the invention.
Figure 16B:
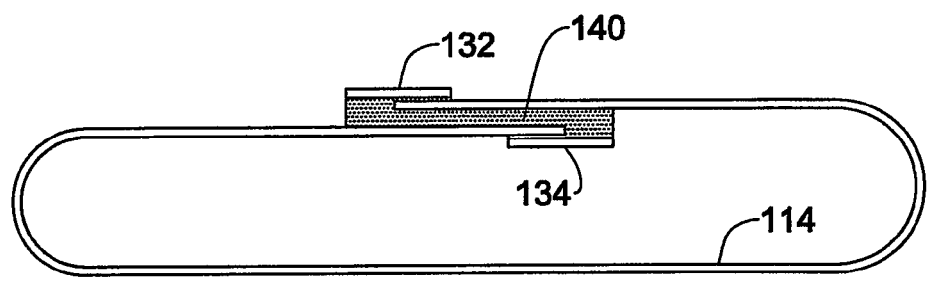
Figure 16C:
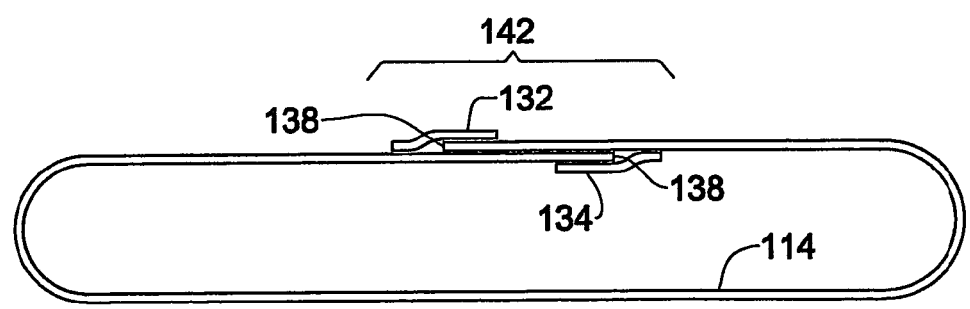

With reference to FIGS. 16A, 16B and 16C there is shown a process of rollable or collapsible pipe production with protective tapes, according to the present invention. Before feeding the polymer strip 114 (the same strip as above) into the piping apparatus 121, two narrow protective tapes 132 and 134 are welded to the margins of the strip (shown in cross section in FIG. 16A, welding zone 136 between either tape and the strip being exaggerated). In the piping apparatus 121, the strip is bent (twisted) into a sleeve with overlapping margins, as seen in FIG. 16B, and the sleeve is welded into a pipe (overlapping welding zone 140 also shown exaggerated). A tight seam 142 is formed, as shown in FIG. 16C, where cut edges 138 are tightly covered by the protective tapes 132 and 134.

The polymer strip 114 for making a pipe usually has layered structure, including polymer film or fabric and various laminating and coating layers. The function of the protective tapes is to prevent the irrigation water from penetrating between these layers from the cut edge 138, and weakening the pipe. The protective tapes are preferably thin polymer tapes.

The welding of the tapes and the strip edges is done preferably by hot air, without using additional adhesives. It would be appreciated that the welding or bonding may be done by other known technologies like using adhesives, RF welding and others. As it is more important to protect the inner edge, the outer tape 132 may be omitted.

Although a description of specific embodiments and methods has been presented, it is contemplated that various changes could be made without deviating from the scope of the present invention. For example, the integral connectors may be arranged in two rows along the pipe, or may be fitted with tearable caps similar to ones in liquid bags. The fitting of the integral connectors may be performed by pressing, press-heating or other methods. The pipe may be punched before fitting the connectors, etc. The method of fitting to the strip before forming a closed pipe may be used for attaching other irrigation elements such as drip emitters or sprinklers (nozzles). The production scheme may include rolling of the strip with fitted irrigation elements into a reel on one production line (e.g. after the elements welding) as semi-finished product, and forming of the pipe in a piping apparatus on another production line.

Those skilled in the art to which this invention pertains will readily appreciate that numerous changes, variations and modifications can be made without departing from the scope of the invention *mutatis mutandis*.

The invention claimed is:

1. A rollable irrigation pipe comprising:
   a pipe having a plurality of molded-directly-on-the-pipe pipe connectors provided on a pipe wall thereof; wherein:
   at least in the vicinity of each pipe connector, the pipe wall comprises a multilayered material having oppositely facing top and bottom layers of which at least one layer is made of a water-repellant material, and an inner layer made of a porous material;
   each pipe connector has a first surface configured for attachment of a lateral connector for a branching pipe, and an outer sidewall provided with a circumferential slot;
   the circumferential slot comprises opposing top abutment and bottom abutment surfaces which are mirror images of one another;
   a portion of the pipe wall is tightly fitted in the circumferential slot with the oppositely facing top and bottom layers of the multilayered material being abutted by corresponding opposing top and bottom abutment surfaces of the circumferential slot, to thereby prevent fluid within the pipe from being absorbed by the inner layer of the multilayered material; and
   the irrigation pipe is rollable onto a reel.

2. The irrigation pipe according to claim 1, wherein the pipe is collapsible.

3. The irrigation pipe according to claim 1, wherein each layer is bonded to adjacent layers.

4. The irrigation pipe according to claim 1, wherein the top and bottom layers are formed of a meltable material.

5. The irrigation pipe according to claim 4, wherein a melted portion of at least one of the top and bottom layers covers a cut surface of the pipe in an area of the inner layer, to thereby form a seal.

6. The irrigation pipe according to claim 1, wherein the pipe connectors are formed from material of the pipe.

7. The irrigation pipe according to claim 1, wherein each pipe connector is made from a single piece of material.

8. The irrigation pipe according to claim 1, wherein both the top and bottom layers are made of a water-repellant material.

9. The rollable irrigation pipe according to claim 1, wherein:
   each molded-directly-on-the-pipe pipe connector is minor-symmetric about the slot, in a cross-sectional view thereof.

10. A rollable irrigation pipe comprising:
   a pipe having a plurality of molded-directly-on-the-pipe pipe connectors provided on a pipe wall thereof; wherein:
   at least in the vicinity of each pipe connector, the pipe wall comprises a multilayered material having oppositely facing top and bottom layers of which at least one layer is made of a water-repellant material, and an inner layer made of a porous material;
   each pipe connector has means for attachment of a lateral connector for a branching pipe, and an outer sidewall provided with a circumferential slot;
   the circumferential slot comprises opposing top abutment and bottom abutment surfaces which are mirror images of one another;
   a portion of the pipe wall is tightly fitted in the circumferential slot with the oppositely facing top and bottom layers of the multilayered material being abutted by corresponding opposing top and bottom abutment surfaces of the circumferential slot, to thereby prevent fluid within the pipe from being absorbed by the inner layer of the multilayered material; and the irrigation pipe is rollable onto a reel.

11. The rollable irrigation pipe according to claim 10, wherein:
   each molded-directly-on-the-pipe pipe connector is minor-symmetric about the slot, in a cross-sectional view thereof.

* * * * *